United States Patent
Sawada

(10) Patent No.: US 12,488,581 B2
(45) Date of Patent: Dec. 2, 2025

(54) LEARNING DEVICE INCLUDING A MACHINE LEARNING MATHEMATICAL MODEL

(71) Applicant: Mitsubishi Electric Corporation, Tokyo (JP)

(72) Inventor: Tomoya Sawada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 197 days.

(21) Appl. No.: 18/235,677

(22) Filed: Aug. 18, 2023

(65) Prior Publication Data

US 2023/0394807 A1   Dec. 7, 2023

Related U.S. Application Data

(63) Continuation of application No. PCT/JP2021/013407, filed on Mar. 29, 2021.

(51) Int. Cl.
*G06V 10/82* (2022.01)
(52) U.S. Cl.
CPC .................... *G06V 10/82* (2022.01)
(58) Field of Classification Search
CPC .... G06V 10/82; G06V 10/454; G06V 10/764; G06V 10/774; G06V 10/40; G06V 10/757; G06V 10/776; G06V 20/56; G06V 40/10; G06N 3/045; G06N 3/0464; G06N 3/096; G06N 3/09; G06N 3/08; G06N 3/084;

(Continued)

(56) References Cited

U.S. PATENT DOCUMENTS 10,311,337 B1 * 6/2019 Kim ...................... G06F 18/217
10,325,371 B1 * 6/2019 Kim ...................... G06N 3/045
(Continued)

FOREIGN PATENT DOCUMENTS

JP        2017-33529 A      2/2017
JP        2018-520404 A     7/2018
(Continued)

OTHER PUBLICATIONS

Extended European Search Report for European Application No. 21934805.9, dated Apr. 2, 2024.
(Continued)

*Primary Examiner* — Michael S Osinski
(74) *Attorney, Agent, or Firm* — Birch, Stewart, Kolasch & Birch, LLP

(57) ABSTRACT

A learning device according to the present disclosed technology is a learning device including a coupled mathematical model capable of machine learning and learning a data set of a target domain from a data set of an original domain for a teacher, in which a pre-stage part of the coupled mathematical model generates a plurality of low-level feature maps from input image data, compares the low-level feature maps of data sets belonging to the same type of learning target for the original domain and the target domain in the image data, and calculates domain-shared features, and calculates domain relaxation learning information for each space of {1} color, {2} illumination, {3} low frequency component, and {4} high frequency component among the domain-shared features.

1 Claim, 6 Drawing Sheets

(58) Field of Classification Search
CPC .......... G06N 3/04; G06N 3/048; G06N 3/063; G06N 3/088; G06N 3/082; G06T 2207/20084; G06T 2207/20081; G06T 2207/10024; G06T 2207/10016; G06T 2207/10028; G06T 2207/20021; G06T 3/40; G06T 5/70

See application file for complete search history.

(56) References Cited

U.S. PATENT DOCUMENTS

| | | | | |
|---|---|---|---|---|
| 11,532,312 | B2* | 12/2022 | Khalil | G10L 19/167 |
| 11,775,370 | B2* | 10/2023 | Roberts | G06F 11/0793 714/6.1 |
| 11,852,591 | B2* | 12/2023 | Naruse | G06V 10/25 |
| 12,061,971 | B2* | 8/2024 | Bielby | G06N 3/088 |
| 12,135,671 | B2* | 11/2024 | Kale | G06F 13/4282 |
| 12,136,230 | B2* | 11/2024 | Meier | G06T 15/06 |
| 12,175,698 | B2* | 12/2024 | Li | G06V 10/82 |
| 12,248,949 | B2* | 3/2025 | Mittal | G06N 20/00 |
| 12,288,387 | B2* | 4/2025 | Vijayakumar | G06F 18/214 |
| 2016/0259995 | A1 | 9/2016 | Ishii et al. | |
| 2016/0321540 | A1 | 11/2016 | Towal | |
| 2017/0318240 | A1* | 11/2017 | Yu | G06T 5/20 |
| 2019/0043203 | A1* | 2/2019 | Fleishman | G06F 18/29 |
| 2019/0102640 | A1 | 4/2019 | Balasubramanian | |
| 2019/0220675 | A1* | 7/2019 | Guo | G06F 18/2113 |
| 2020/0228830 | A1* | 7/2020 | Zhang | H04N 19/159 |
| 2020/0241544 | A1* | 7/2020 | Kim | G06N 3/08 |
| 2020/0250544 | A1* | 8/2020 | Katoh | G06F 18/2115 |
| 2020/0302637 | A1* | 9/2020 | Kobayashi | G06V 20/10 |
| 2021/0104015 | A1* | 4/2021 | Wang | G06N 3/045 |
| 2021/0166066 | A1* | 6/2021 | Ando | G06V 10/764 |
| 2021/0216818 | A1 | 7/2021 | Umeda et al. | |
| 2021/0256290 | A1* | 8/2021 | Wu | G06V 10/82 |
| 2021/0264314 | A1* | 8/2021 | Oura | G06N 5/04 |
| 2021/0295155 | A1* | 9/2021 | Vijayakumar | G06F 18/214 |
| 2021/0390723 | A1* | 12/2021 | Ye | G06T 7/564 |
| 2022/0086410 | A1* | 3/2022 | Meng | G06T 7/90 |
| 2022/0148051 | A1* | 5/2022 | Bagnall | G06Q 40/08 |
| 2022/0222928 | A1* | 7/2022 | Sasaki | G06V 10/778 |
| 2022/0374647 | A1* | 11/2022 | Lee | G06N 3/09 |
| 2023/0101024 | A1* | 3/2023 | Yuan | G06V 10/757 382/100 |
| 2023/0126829 | A1* | 4/2023 | Grigorev | G06V 40/10 345/419 |
| 2023/0289614 | A1* | 9/2023 | Takehara | G06V 10/776 |
| 2023/0394282 | A1* | 12/2023 | Wang | G06N 3/0464 |
| 2024/0062530 | A1* | 2/2024 | Panetta | G06V 10/7715 |
| 2025/0005827 | A1* | 1/2025 | Sang | G06T 11/60 |

FOREIGN PATENT DOCUMENTS

| | | |
|---|---|---|
| JP | 2019-79505 A | 5/2019 |
| JP | 2019-175107 A | 10/2019 |
| JP | 2019-207491 A | 12/2019 |
| JP | 2020-64491 A | 4/2020 |
| JP | 2020-126468 A | 8/2020 |

OTHER PUBLICATIONS

Xie et al., "Towards Effective Deep Transfer via Attentive Feature Alignment", Elsevier, Neural Networks, vol. 138, Feb. 10, 2021, XP086538089, pp. 98-109.

Communication pursuant to Article 94(3) EPC issued in European Application No. 21 934 805.9 on Feb. 11, 2025.

Bak et al., "Domain Adaptation through Synthesis for Unsupervised Person Re-identification", Computer Vision and Pattern Recognition, 2018, pp. 1-17.

Hu et al., "Squeeze-and-Excitation Networks", IEEE/CVF Conference on Computer Vision and Pattern Recognition, Salt Lake City, UT, USA, 2018, pp. 7132-7141.

International Search Report (PCT/ISA/210) issuedi n PCT/JP2021/013407, dated May 11, 2021.

European Communication pursuant to Article 94(3) EPC for European Application No. 21 934 805.9, dated Sep. 15, 2025.

Chinese Office Action and Search Report for Chinese Application No. 202180096136.5, dated Oct. 16, 2025, with English translation of the Office Action.

* cited by examiner

LEARNING DEVICE INCLUDING A MACHINE LEARNING MATHEMATICAL MODEL

CROSS REFERENCE TO RELATED APPLICATIONS

This application is a Continuation of PCT International Application No. PCT/JP2021/013407 filed on Mar. 29, 2021, which is hereby expressly incorporated by reference into the present application.

TECHNICAL FIELD

The present disclosure relates to an inference device, an inference method, a learning device, a learning method, and a program.

BACKGROUND ART

There is known a technology related to an identification device that performs various types of identification by inferring a captured image captured by a camera using information learned in advance. An identification device that performs this inference using a neural network is disclosed, and is enhanced by machine learning such as deep learning.

Furthermore, a conventional technique related to an identification device discloses a technique of performing robust inference with respect to external factors such as weather when a captured image is captured using a convolutional neural network (CNN) (for example, Patent Literature 1).

CITATION LIST

Patent Literature

Patent Literature 1: JP 2019-175107 A

SUMMARY OF INVENTION

Technical Problem

The prior art exemplified in Patent Literature 1 is certainly robust against a change level of an image due to an external factor such as weather. However, in a case where images having different domains are to be handled, the change level of the image is too large, and thus learning and inference cannot be correctly performed in the prior art. Here, the domain means a type of image, and examples thereof include a live-action RGB image, a thermal infrared image (hereinafter referred to as a "TIR image") by an infrared camera, an illustration image, and an image generated by a CG simulator. The scene where it is necessary to handle images having different domains is that there are a lot of live-action RGB images for learning but there are not a lot of TIR images to be originally learned in the person recognition by the monitoring camera using the infrared image.

An object of the present disclosure is to solve the above problems and to provide an inference device, an inference method, a learning device, a learning method, and a program capable of correctly performing learning and inference even for images having different domains.

Solution to Problem

A learning device according to the present disclosure includes a coupled mathematical model capable of machine learning, and learns a data set of a target domain from a data set of an original domain for teacher, in which a pre-stage part of the coupled mathematical model generates a plurality of low-level feature maps from input image data, compares the low-level feature maps of data sets belonging to a learning target of a same type for the original domain and the target domain in the image data, calculates domain-shared features, and calculates domain relaxation learning information for each space of (1) color, (2) illumination, (3) low frequency component, and (4) high frequency component in the domain-shared features. A learning device according to the present disclosure further includes, a high dimension feature imparter to weight a feature map of the target domain input using the domain relaxation learning information to generate a new weighting feature map, and a learning information corrector to switch the domain-shared features emphasized according to Epoch of main learning of the inference device.

Advantageous Effects of Invention

The learning device according to the present disclosed technology well utilizes the essence of learning of the order of the acquired features. The kind of essence mentioned here, is that, the simpler the feature is, such as "color", the faster the mathematical model represented by CNN completes the learning in the earlier stage. As a result, the learning device according to the present disclosed technology can handle images having different domains in learning. Furthermore, by using information learned by the learning device according to the present disclosed technology, it is possible to handle images having different domains in inference.

BRIEF DESCRIPTION OF DRAWINGS

FIG. 2A illustrates a flow of learning and inferring an image of an original domain. FIG. 2B illustrates a flow of filter learning to prepare for processing a target domain image. FIG. 2C illustrates a flow when learning and inferring an image of a target domain.

DESCRIPTION OF EMBODIMENTS

Figure 1:
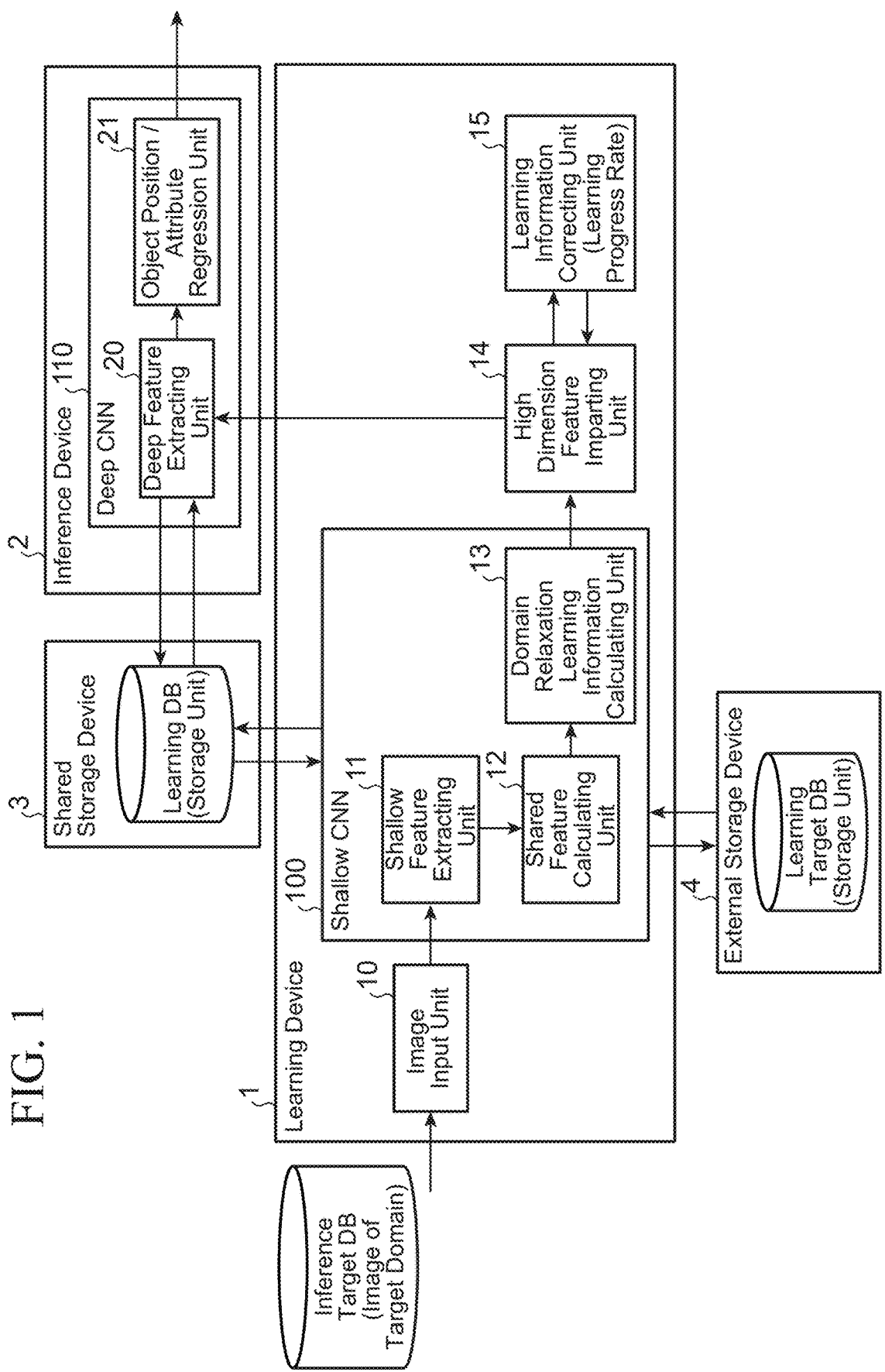
FIG. 1 is a system block diagram illustrating a configuration example of a system including a learning device and an inference device according to a first embodiment.

The present disclosed technology will be clarified by the description with reference to the drawings for each of the following embodiments. The present disclosed technology is used for various identification devices that perform inference on a captured image captured by a camera using information learned in advance. The present disclosed technology can also be used for, for example, a monitoring camera using an infrared image, a future room air conditioner including a person detection camera, and the like.

More specifically, the present disclosed technology relates to learning and inferring a data set of a target domain from a data set of an original domain for teaching.

The present disclosed technology is effective in a situation where it is necessary to handle images having different domains. For example, in the person recognition by the monitoring camera using the infrared image, there are many live-action RGB images as a learning data set, but there are not many TIR images that can be used in the actual learning. Here, a type of an image that can be sufficiently prepared for learning such as a live-action RGB image is referred to as an "original domain", and a type of an image that is actually desired to be learned such as a TIR image is referred to as a "target domain".

Since the present disclosed technology is based on CNN, a brief overview of CNN and a brief description of terms used in CNN will be given here. The CNN is also called a convolutional neural network, and has properties such as global position invariance and rotation invariance. CNN is a type of multilayer perceptron that combines a convolution layer, a pooling layer, and a fully connected layer.

The image and each layer of the CNN handled by the present disclosed technology can be each expressed by the spatial resolution and the channel of the feature map. The number of dimensions of an image is determined by the number of pixels in the horizontal direction, the number of pixels in the vertical direction, and the number of channels. Here, the number of channels is a value of a different dimension between horizontal and vertical, which is 3 for an RGB image and 1 for a TIR image. That is, the total number of dimensions of the image can be expressed by the number of pixels in the horizontal direction x the number of pixels in the vertical direction x the channel.

The convolution layer in the CNN performs an operation called two-dimensional convolution. A well-known example of convolution operation in general image processing is a Gaussian filter that performs blurring operation. The filter that performs the convolution operation is called a convolution filter. In the processing by the convolution filter, for example, a kernel that can be regarded as a small image patch such as 3×3 is placed in each pixel of an input image, and an inner product of the input image and the kernel is output to each pixel. The convolution layer in the CNN has a multistage layer including a plurality of convolution filters in general, and in deep learning, by incorporating an activation function (Activation) and batch normalization before and after the convolution layer, an effect of preventing overlearning on the locality of learning data without causing gradient loss is provided.

As the activation function, for example, a nonlinear function such as rectified linear unit (ReLU), Sigmoid, or Softmax is used, and it is possible to avoid a gradient loss problem in which differentiation cannot be performed in a linear space at the time of gradient propagation to a convolution layer by back propagation method by escaping from a linear space.

The convolution layer can be operated in any dimension in such a manner that an input is M channels and an output is N channels. The number of convolution filters included in the convolution layer is expressed as a channel. The size of the convolution layer can be expressed by the number of channels of the output layer×the vertical size of the feature map×the horizontal size of the feature map. The output of the convolution layer includes spatial information and is called a feature map or a feature amount map.

The pooling layer in the CNN performs an operation to reduce the resolution of the image, which is also called subsampling, to reduce the size while leaving the features, thereby reducing the position sensitivity of the features, and obtaining the global position invariance and rotation invariance. Since the CNN for image classification finally outputs a vector, the resolution is gradually reduced. Although several methods are conceivable for the pooling layer, maximum value pooling is often used. The maximum value pooling is to perform resizing for outputting the maximum value for each feature map. The convolution layer and the pooling layer are layers utilizing the structure of an image and have spatial information.

In CNN, the fully connected layer may be placed at the end of the network. Unlike the convolution layer and the pooling layer, the fully connected layer does not have a structure of horizontal x vertical x channel, and features quantized as vectors are described. The fully connected layer may be used for dimension reduction or expansion, and it is possible to acquire a more conceptual high-dimensional semantic feature (semantics) by connecting each pixel of the feature map not only to the neighboring region but also to the entire region.

First Embodiment

FIG. 1 is a system block diagram illustrating a configuration example of a system including a learning device 1 and an inference device 2 according to a first embodiment. As illustrated in FIG. 1, the system according to the present disclosed technology includes the learning device 1, the inference device 2, a shared storage device 3 in which the learning device 1 and the inference device 2 can share information, and an external storage device 4 accessed by the learning device 1.

As illustrated in FIG. 1, the learning device 1 includes an image input unit 10, a shallow feature extracting unit 11, a shared feature calculating unit 12, a domain relaxation learning information calculating unit 13, a high dimension feature imparting unit 14, and a learning information correcting unit 15. Furthermore, as illustrated in FIG. 1, the inference device 2 includes a deep feature extracting unit 20 and an attribute regression unit 21.

Figure 2A:
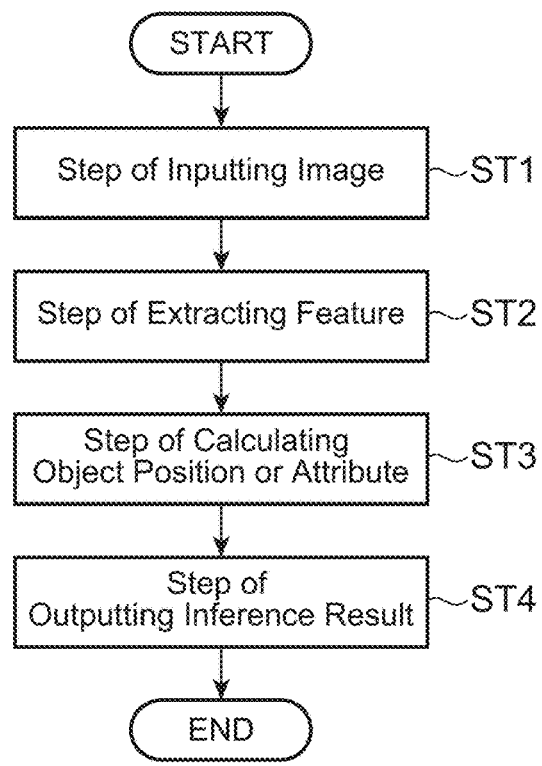
FIG. 2A to 2C show flowcharts illustrating a processing flow of the system according to the first embodiment.
Figure 2B:
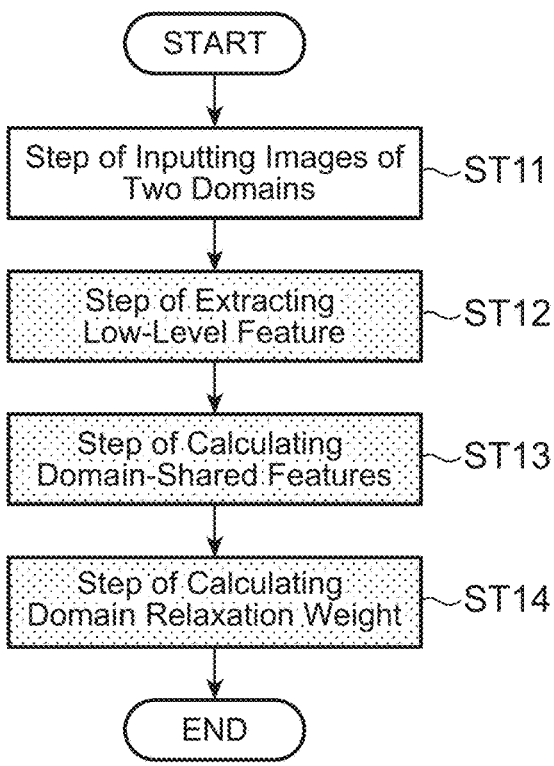
Figure 2C:
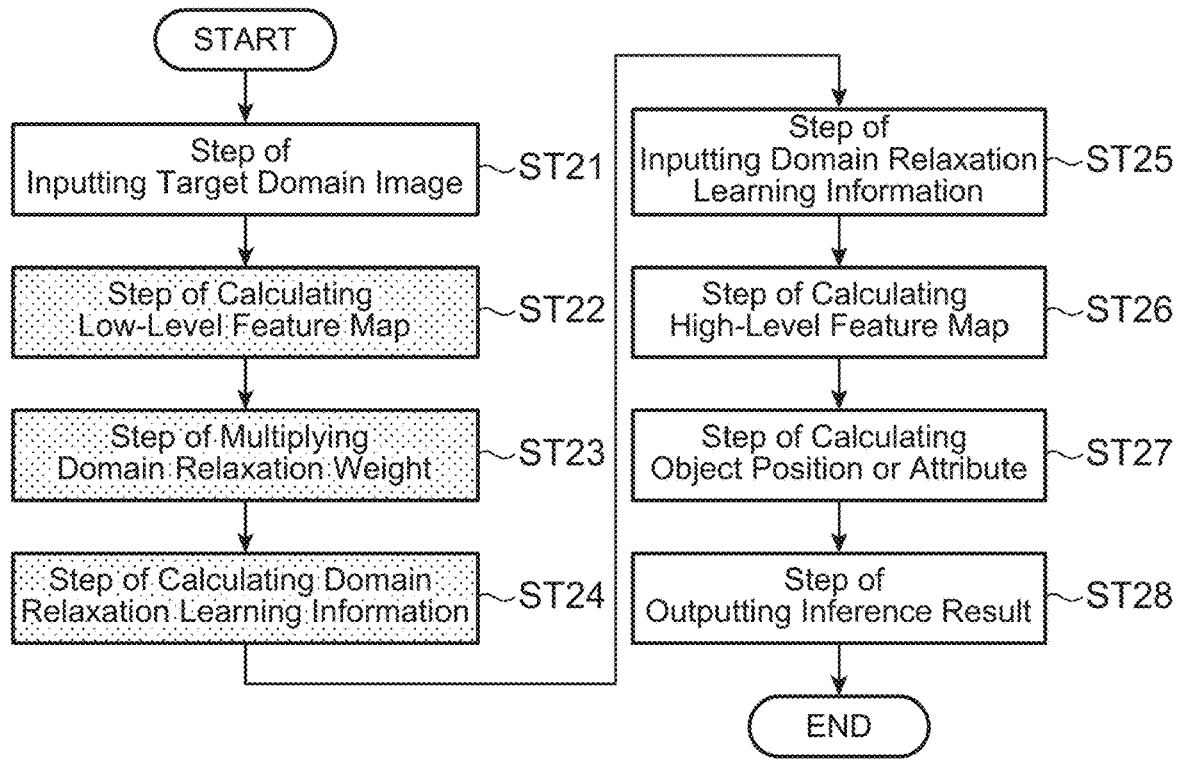

FIG. 2 is a flowchart illustrating a processing flow of the system according to the first embodiment. FIG. 2A illustrates a flow of learning and inferring an image of an original domain. FIG. 2B illustrates a flow of filter learning to prepare for processing a target domain image. FIG. 2C illustrates a flow when learning and inferring an image of a target domain. Here, both the learning of the image in the original domain and the learning of the image in the target domain are classified as supervised learning. Patterned portions in FIGS. 2B and 2C indicate steps performed by a shallow CNN 100 to be described later.

The learning of the image of the original domain may be performed by constructing a machine learning model that performs image recognition by CNN, which is a representative method of deep learning. The processing of constructing the machine learning model includes step ST1 of inputting an image as illustrated in FIG. 2A, step ST2 of extracting a feature, step ST3 of calculating an object position or an attribute, and step ST4 of outputting an inference result.

The purpose of machine learning varies depending on a situation in which a machine learning model is used. For example, in a case where a machine learning model is used for the object recognition device, the purpose of the machine learning model is to estimate where and what is present. For example, in a case where what is shown in an image is a car, it is an object to infer at which position in the image there is the car with what attribute. A method of extracting a feature of a teacher image categorized in advance and constructing a machine learning model from a plot in a feature space is known. As a method of obtaining the boundary of each category in this feature space, a support vector machine (SVM) or the like is known. Since the feature is usually a plurality of dimensions, the feature space is also referred to as a high dimension feature space. Note that the expression "belonging to the same category" can be more broadly read as "belonging to the same type of learning target".

The processing of performing classification of the attributes of the image or the processing of performing regression of the position of the object corresponds to step ST3 of calculating the object position or the attribute in FIG. 2A.

The learning of the image of the target domain is performed at a stage where the learning of the image of the original domain is completed. The learning of the image of the target domain is performed by two-stage learning. The two-stage learning includes learning (Hereinafter, referred to as "filter learning") in the shallow feature extracting unit 11, the shared feature calculating unit 12, and the domain relaxation learning information calculating unit 13 and learning (Hereinafter, referred to as "main learning") in the deep feature extracting unit 20. The image data of the target domain is first input to the learning device 1 via the image input unit 10. The image data input via the image input unit 10 is output to the shallow feature extracting unit 11. FIG. 2B illustrates a flow of processing in the filter learning, and FIG. 2C illustrates a flow of processing in the main learning.

The shallow feature extracting unit 11 includes a plurality of image filters that output a plurality of low-level feature maps from input image data. Since the shallow feature extracting unit 11 is a plurality of image filters, it is conceivable to configure the shallow feature extracting unit with a convolution layer of CNN. In the learning device 1 according to the first embodiment, the shallow feature extracting unit 11, the shared feature calculating unit 12, and the domain relaxation learning information calculating unit 13 include a CNN (hereinafter, referred to as a "shallow CNN 100") of a shallow layer.

The shallow CNN 100 which is the Shallow CNN is designed to extract shared features (Domain Shared Features in English, and hereinafter referred to as "domain-shared features") when the feature of the image data in the original domain and the feature of the image data in the target domain are plotted in a high dimension feature space. Therefore, the image data of the original domain and the image data of the target domain are input to the shallow feature extracting unit 11 as teacher data. In an initial stage of filter learning, a plot in a high dimension feature space appears as random, but a certain law is gradually seen in a distribution for each category of an image.

Figure 5:
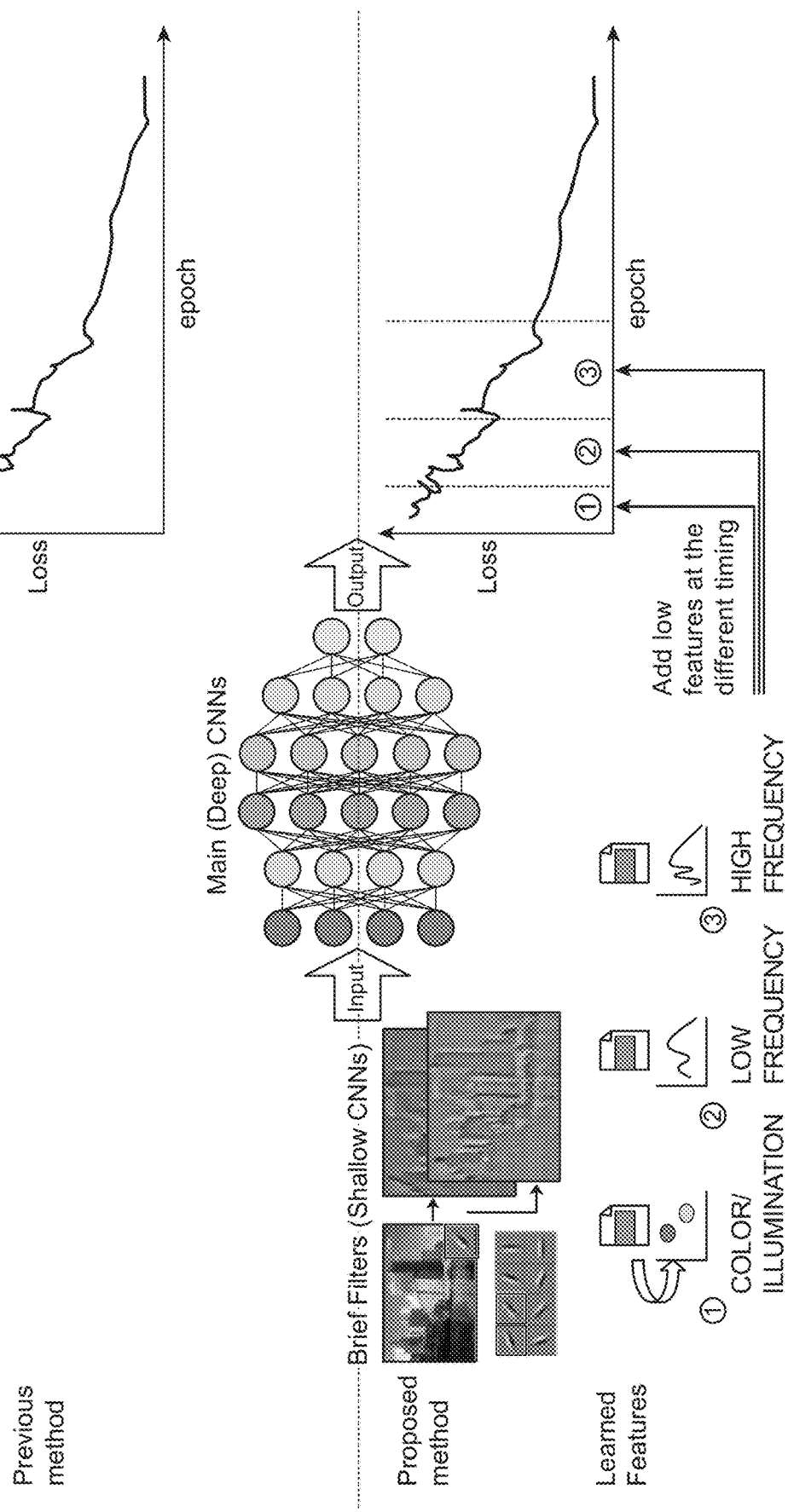
FIG. 5 is an explanatory diagram No. 1 supplementing the concept of the present disclosed technology.

FIG. 5 is an explanatory diagram No. 1 supplementing the concept of the present disclosed technology. As illustrated in FIG. 5, in the present disclosed technology, (1) color, (2) illumination, (3) low frequency component, and (4) high frequency component, which are low-level features, are added intentionally according to Epoch of learning. Specifically, the feature map output by the shallow feature extracting unit 11 is designed to have low-level features of (1) color, (2) illumination, (3) low frequency component, and (4) high frequency component. (3) The low frequency component may be rephrased as blur information in the image. In addition, (4) the high frequency component may be referred to as an edge and a texture. The shallow feature extracting unit 11 performs step ST12 of extracting a low-level feature.

The domain-shared features among the low-level features extracted by the shared feature calculating unit 12 teaches the domain-shared feature by adding the low-level features intentionally according to the degree of progress in the main learning of the image of the target domain.

In the shallow CNN 100, a method called Attention is used as a method of obtaining a feature map in which the domain-shared feature is emphasized (Hereinafter, referred to as a "weighting feature map"). Simply put, Attention is a method of automatically learning which region of the feature map output by the CNN should be focused on. In other words, Attention is the weighting for a region to be noted. Like the feature map has horizontal x vertical spatial dimensions and channel dimensions, the teaching method using Attention also has Attention in the spatial direction and Attention in the channel direction. For Attention in the channel direction, a technique called SE block is disclosed (For example, Non-Patent Literature 1).

Non-Patent Literature 1: Hu, Jie, Li Shen, and Gang Sun. "Squeeze-and-excitation networks". Proceedings of the IEEE conference on computer vision and pattern recognition.2018.

Figure 6:
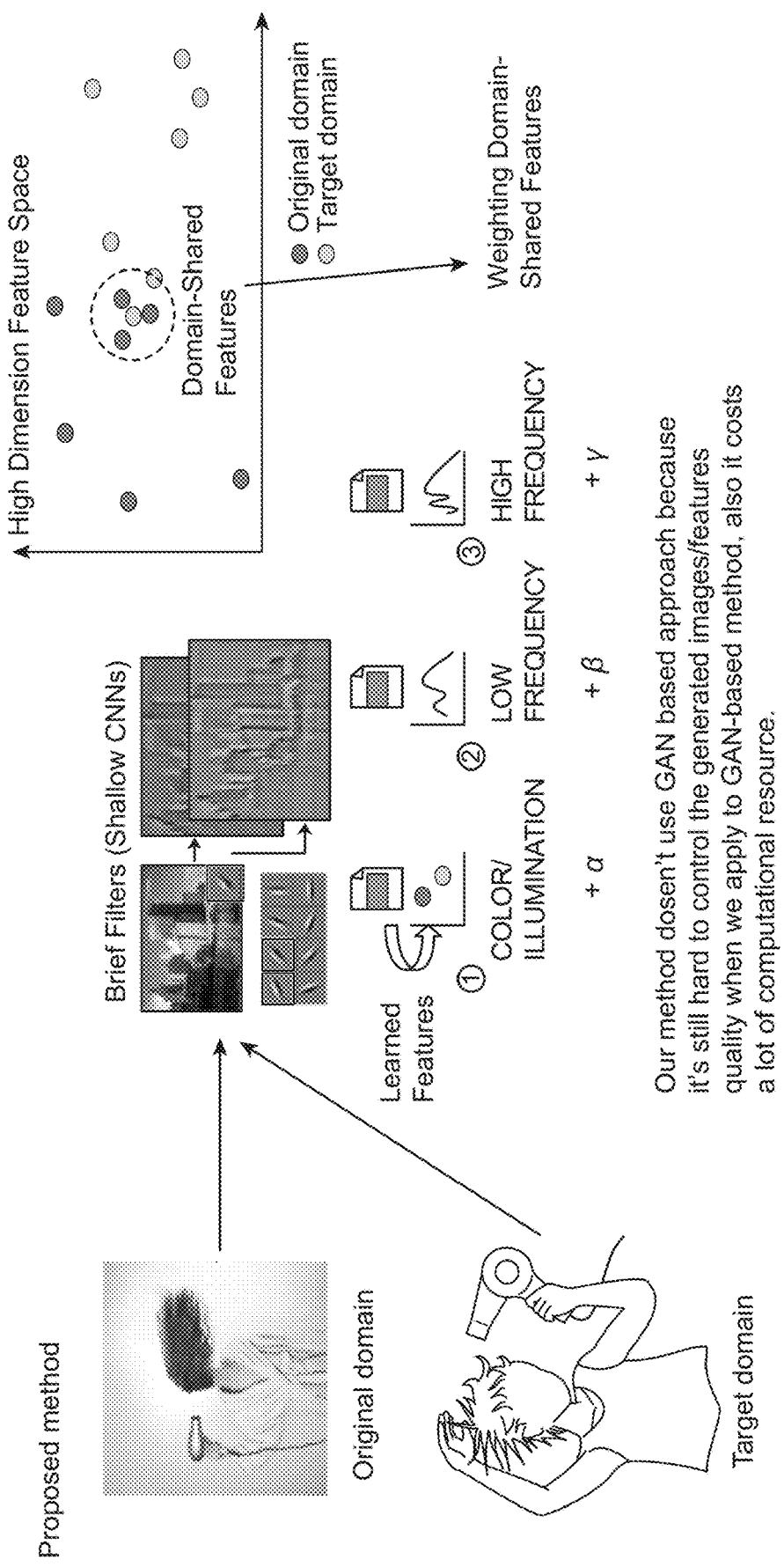
FIG. 6 is an explanatory diagram No. 2 supplementing the concept of the present disclosed technology.

FIG. 6 is an explanatory diagram No. 2 supplementing the concept of the present disclosed technology. As illustrated in FIG. 6, the shared feature calculating unit 12 of the shallow CNN 100 compares the feature maps of the data sets belonging to the same category for the two domains. The comparison of the plots in the high dimension feature space is illustrated in the graph on the right side of FIG. 6. FIG. 6 illustrates a comparison of data sets of the category "Drying Hair with Hair Dryer" with the original domain as a photograph and the target domain as an illustration. The following is a specific example of comparing another plot. For example, the category is a teenage male, and the two domains are an original domain of an RGB image and a target domain of a TIR image. The teacher image of each domain is input to the shallow feature extracting unit 11, and each feature map is output. The shared feature calculating unit 12 compares the feature maps for each channel, and imparts a large weight to a channel having a domain-shared feature.

More specifically, the shared feature calculating unit 12 may spatially compare the feature maps of the original domain and the target domain calculated by the shared feature calculating unit 12, calculate a distance between the most similar feature maps by, for example, image correlation, similarity in units of pixels, structure similarity (SSIM), or the like, and use the distance as a weight.

Furthermore, the shared feature calculating unit 12 may calculate a representative value by applying global average pooling (GAP) to a feature map in a simpler manner, calculate a distance between representative values of the most similar feature maps by, for example, image correlation, similarity in units of pixels, structure similarity (SSIM), or the like, and use the distance as a weight.

In this manner, the shared feature calculating unit 12 calculates a feature map emphasizing a channel to be noted (step ST13 of calculating domain-shared feature amount). The weight is referred to as a "domain relaxation weight". The feature map in which the domain-shared feature is emphasized is referred to as a "domain relaxation teaching signal". The weight and the teaching signal are collectively referred to as "domain relaxation learning information". The shared feature calculating unit 12 of the shallow CNN 100 performs step ST14 of calculating a domain relaxation weight.

Although the embodiment using Attention in the channel direction has been described here, Attention in the channel direction and Attention in the spatial direction may be appropriately combined in the present disclosed technology.

The domain relaxation learning information is used as a teaching signal of main learning to be described later. The domain-shared features can be classified into (1) color, (2) illumination, (3) low frequency component, and (4) high frequency component. The domain relaxation learning information calculating unit 13 of the shallow CNN 100 calculates domain relaxation learning information for each of (1) color, (2) illumination, (3) low frequency component, and (4) high frequency component (step ST24 of calculating domain relaxation learning information).

The effect of including the shallow CNN 100 is revealed by comparison with a conventional system without the shallow CNN 100. First, since there are not many data sets of the target domain, the machine learning model cannot be sufficiently learned only with the data set of the target domain. Therefore, it is conceivable to make an attempt to construct a machine learning model with an image of another domain in which there are many data sets, and to perform relearning with an image of a target domain. That is, it is conceivable to make an attempt to perform Pre-Training using the data sets of the original domain and perform transfer learning to the target domain and Fine-Tuning. However, when this is actually performed, the feature of the image is too different between the domains, and the previous learning result is destroyed. The effect of including the shallow CNN 100 has an effect of efficiently alleviating the difference in features between the domains even in a case where the learning data of the target domain is small by not destroying the previous learning result.

When the filter learning in the shallow CNN 100 is completed, the main learning can be performed at last. It is conceivable that the deep feature extracting unit 20 and the attribute regression unit 21 of the inference device 2 are configured by a CNN (Hereinafter, referred to as a "deep CNN 110".) including a deep layer different from the shallow CNN 100. In the main learning, initial learning is performed using data sets of an image of an original domain which are abundant. Roughly two ways of using the data sets of the image of the original domain are conceivable. A method of using data sets of an image of the original domain as they are, and a method of using a feature map in which domain-shared features are emphasized through the shallow CNN 100 described above are conceivable. The learning device 1 according to the present disclosed technology may use the data sets of the image of the original domain by any method.

Figure 4:
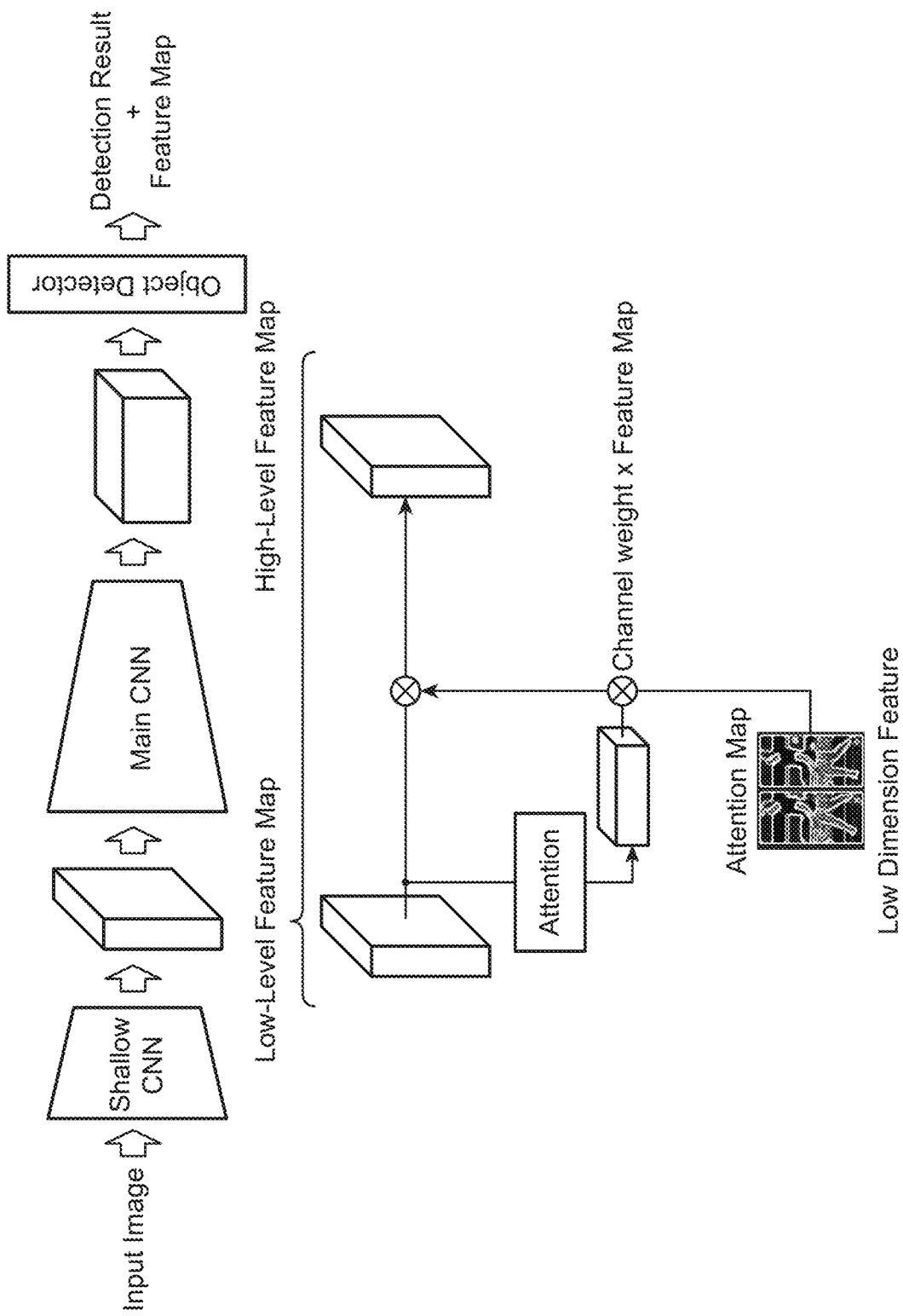
FIG. 4 is a schematic diagram illustrating a concept of the present disclosed technology.

When the initial learning of the main learning is completed, the initial state of the deep CNN 110 is determined, and full-scale learning of the main learning can be performed at last (see the flow illustrated in FIG. 2C). FIG. 4 is a schematic diagram illustrating the concept of the present disclosed technology. As illustrated in FIG. 4, the teacher data of the full-scale learning of the main learning is a data set of the image of the target domain that has passed through the shallow CNN 100. Since the image has passed through the shallow CNN 100 for which filter learning has been completed, the domain-shared features of the image of the target domain are emphasized.

FIG. 2C illustrates a processing flow when learning and inferring the image of the target domain. As illustrated in FIG. 2C, the present processing includes step ST21 of inputting a target domain image, step ST22 of calculating a low-level feature map, step ST23 of multiplying a domain relaxation weight, step ST24 of calculating domain relaxation learning information, step ST25 of inputting the domain relaxation learning information, step ST26 of calculating a high-order feature map, step ST27 of calculating an object position or an attribute, and step ST28 of outputting an inference result. The shallow CNN 100 for which filter learning has been completed performs step ST22 of calculating a low-level feature map, step ST23 of multiplying a domain relaxation weight, and step ST24 of calculating domain relaxation learning information. In addition, the deep CNN 110 performs step ST26 of calculating a high-order feature map and step ST27 of calculating an object position or an attribute.

The largest feature of the learning device 1 according to the present disclosed technology is to change the domain-shared features to be emphasized in the order of (1) color, (2) illumination, (3) low frequency component, and (4) high frequency component according to Epoch of full-scale learning of main learning. The switching of the emphasized domain-shared features is performed by the learning information correcting unit 15 of the learning device 1. Epoch refers to one cycle through the full training dataset, one cycle meaning passing through a neural network once in forward propagation and once in back propagation. Since one Epoch is a large amount handled by a computer at a time, it is usually divided into several Batches. Iteration is the number of Batches required to complete one Epoch. For example, it is assumed that there are 2,000 datasets of teacher images. It is assumed that the 2,000 images are divided into batches each having 500 images. In this example, four Iterations are required to complete one Epoch.

The reason why the features emphasized in such an order are changed in the present disclosed technology is derived from a nature of CNN that the order of the features acquired by the CNN is also the order of (1) color, (2) illumination, (3) low frequency component, and (4) high frequency component.

It is case-by-case to determine which feature is used in which Epoch. In a certain use mode, it was effective to use (1) color and (2) illumination when the Epoch is around 1, to use (3) a low frequency component when the Epoch is 20, and to use (4) a high frequency component when the Epoch is 60. However, this is merely an example, and it is not limited thereto.

The evaluation of the main learning is performed using an image of the target domain. In a case where inference can be performed at a desired correct answer rate even when the image of the target domain is directly input to the deep CNN 110 without processing, the inference device 2 may use the deep CNN 110 for which the main learning has been completed as it is. In a case where inference cannot be performed at a desired correct answer rate, the unprocessed image of the target domain is multiplied by the domain relaxation weight calculated by the learned shallow CNN 100 in the high dimension feature imparting unit 14 of the learning device 1 to generate a processed image (step ST23 of multiplying the domain relaxation weight), and the processed image is input to the deep CNN 110. In the case described first, the inference device 2 is configured only by the deep CNN 110, and in the case described next, the inference device 2 is configured by a combination of the shallow CNN 100 and the deep CNN 110.

When the evaluation of the main learning is completed, the inference device 2 can perform inference on the image of the target domain. The processing flow of the inference device 2 will be clarified by the following description based on FIG. 2C. The description here assumes that the inference device 2 is configured by a combination of the shallow CNN 100 and the deep CNN 110.

The image of the target domain to be inferred is first input to the image input unit 10 (step ST21 of inputting a target domain image). For the input image, a low-level feature map is created in the shallow feature extracting unit 11 of the shallow CNN 100 (step ST22 of calculating a low-level feature map). The created low-level feature map is multiplied by the domain relaxation weight in the high dimension feature imparting unit 14 (step ST23 of multiplying the domain relaxation weight), and an input image to the deep CNN 110 is generated. The deep CNN 110 calculates an object position or an attribute for the image input in the attribute regression unit 21 (step ST27 of calculating the object position or the attribute), and outputs an inference result (step ST28 of outputting an inference result).

If both the data set of the original domain and the data set of the target domain are abundant, it is sufficient to perform learning for each domain, and there is no problem. Furthermore, it is also conceivable to associate the distribution for each category in the high dimension feature space for each domain from the learning result in each domain. The learning device 1 and the inference device 2 according to the present disclosed technology have an effect that learning proceeds so that the recognition rate does not decrease even when the data amount of the data set of the target domain is small.

Second Embodiment

The system including the learning device 1 and the inference device 2 according to the first embodiment is based on the assumption that there is a certain amount of data set of the target domain for learning although there is not much data set. The system including the learning device 1 and the inference device 2 according to a second embodiment can cope with a case where there is no data set of the target domain at all in the learning stage. In general, a problem of learning a class having no teacher data to be inferred in a learning stage is called a Zero-Shot learning problem. In the following description of the second embodiment, the same reference numerals are used for components common to those of the first embodiment, and redundant description will be omitted as appropriate.

Figure 3:
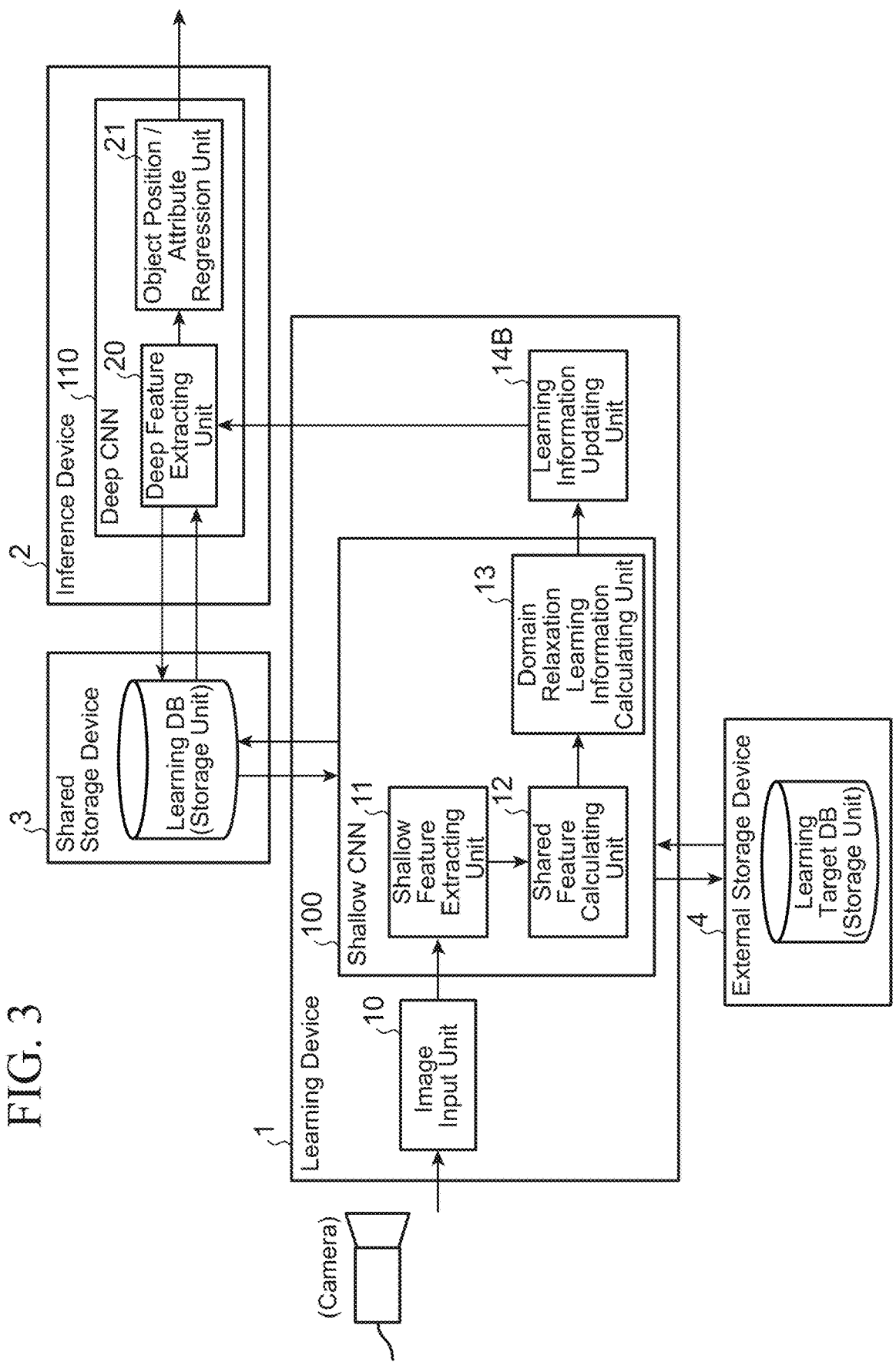
FIG. 3 is a system block diagram illustrating a configuration example of a system including a learning device and an inference device according to a second embodiment.

FIG. 3 is a system block diagram illustrating a configuration example of a system including a learning device 1 and an inference device 2 according to the second embodiment. As illustrated in comparison between FIG. 3 and FIG. 1, the learning device 1 according to the second embodiment includes a learning information updating unit 14B instead of the high dimension feature imparting unit 14 and the learning information correcting unit 15.

Even in the case of the system including the learning device 1 and the inference device 2 according to the second embodiment, the concept of the core that solves the problem is the same as in the case of the first embodiment. That is, the system according to the second embodiment attempts to solve the problem by simultaneously performing filter learning and main learning from one target domain image given first. Specifically, the learning information updating unit 14B simultaneously performs step ST23 of multiplying the domain relaxation weight performed by the high dimension feature imparting unit 14 and switching of the domain-shared features to be emphasized performed by the learning information correcting unit 15.

The deep CNN 110 of the inference device 2 according to the second embodiment uses the same neural network as the neural network of the inference device 2 prepared for the image of the original domain (see FIG. 2A). In addition, as the initial state of the deep CNN 110, the initial state of the neural network in which learning is sufficiently completed with the large-scale image data set of the original domain may be used.

As described above, since the system including the learning device 1 and the inference device 2 according to the second embodiment has the above-described configuration, there is an effect that inference can be performed at a certain correct answer rate even in the case of the Zero-Shot learning problem in which no data set of the target domain is obtained.

Third Embodiment

In the first embodiment and the second embodiment, the shallow CNN 100 and the deep CNN 110, which are core components, are depicted as "two independent CNNs" adopting CNN. However, the components corresponding to the shallow CNN 100 and the deep CNN 110 according to the present disclosed technology do not need to be two independent CNNs or do not need to be CNNs in the first place. A third embodiment makes clear the present disclosed technology that employs configuration examples other than "two independent CNNs".

First, in a first configuration example, the shallow CNN 100 and the deep CNN 110 are implemented as one large coupled CNN 120, and are shared by the learning device 1 and the inference device 2. Since the coupled CNN 120 is a type of multilayer neural network, it can be divided into a pre-stage layer 121 and a post-stage layer 122. The pre-stage layer 121 of the coupled CNN 120 may serve as the shallow CNN 100, and the post-stage layer 122 of the coupled CNN 120 may serve as the deep CNN 110. That is, the coupled CNN 120 has a function of extracting a high dimension feature with respect to an input image.

The method of sharing the coupled CNN 120 may be implemented and shared on a cloud, or may be connected online.

In a second configuration example, the coupled CNN 120 is implemented by a neural network other than the CNN. A component implementing the coupled CNN 120 by a neural network other than the CNN is referred to as a coupled NN 130. The coupled NN 130 is divided into a coupled NN pre-stage layer 131 and a coupled NN post-stage layer 132. The coupled NN pre-stage layer 131 may serve as the shallow CNN 100, and the coupled NN post-stage layer 132 may serve as the deep CNN 110. That is, the coupled NN 130 has a function of extracting a high dimension feature with respect to the input image.

Note that since the coupled NN 130 is a multilayer neural network, it can be said that the learning method is deep learning.

A method of sharing the coupled NN 130 may also be implemented and shared on a cloud, or may be connected online.

In a third configuration example, the coupled CNN 120 is implemented by a mathematical model other than the neural network. A component implementing the coupled CNN 120 by a mathematical model other than the neural network is referred to as a coupled mathematical model 140. The coupled mathematical model 140 includes a coupled mathematical model pre-stage part 141 and a coupled mathematical model post-stage part 142. The coupled mathematical model pre-stage part 141 may serve as the shallow CNN 100, and the coupled mathematical model post-stage part 142 may serve as the deep CNN 110. That is, the coupled mathematical model 140 has a function of extracting a high dimension feature with respect to the input image.

Similarly to the coupled CNN 120, the coupled mathematical model 140 needs to include an input unit, a calculation unit that calculates an output from the input by a variable parameter, and an output unit. In addition, the coupled mathematical model 140 needs to be capable of machine learning by changing a variable parameter on the basis of an evaluation function for evaluating an output. Such a coupled mathematical model 140 is described as "learnable" here.

A method of sharing the coupled mathematical model 140 may also be implemented and shared on a cloud, or may be connected online.

In both the case of using the coupled NN 130 and the case of using the coupled mathematical model 140, the present disclosed technology changes the domain-shared features to be emphasized in the order of (1) color, (2) illumination, (3) low frequency component, and (4) high frequency component according to Epoch of full-scale learning of main learning. This utilizes a property that, in machine learning in image recognition or the like, learning is completed at an initial stage of learning as a simpler feature represented by "color" is provided.

As described above, since the learning device 1 and the inference device 2 according to the third embodiment have the above-described configurations, learning and inference can be correctly performed even for images having different domains without adopting two independent CNNs.

INDUSTRIAL APPLICABILITY

The inference device 2, the inference method, the learning device 1, the learning method, and the program according to the present disclosed technology can be used for an identification device that performs various types of identification on a captured image, and have industrial applicability.

REFERENCE SIGNS LIST

1: learning device, 2: inference device, 3: shared storage device, 4: external storage device, 10: image input unit, 11: shallow feature extracting unit, 12: shared feature calculating unit, 13: domain relaxation learning information calculating unit, 14: high dimension feature imparting unit (high dimension feature imparter), 14B: learning information updating unit, 15: learning information correcting unit (learning information corrector), 20: deep feature extracting unit, 21: attribute regression unit, 100: shallow CNN, 110: deep CNN, 120: coupled CNN, 121: pre-stage layer, 122: post-stage layer, 130: coupled NN, 131: coupled NN pre-stage layer, 132: coupled NN post-stage layer, 140: coupled mathematical model, 141: coupled mathematical model pre-stage part, 142: coupled mathematical model post-stage part

What is claimed is:

1. A learning device, comprising: a coupled mathematical model configured for machine learning and learning a data set of a target domain from a data set of an original domain for a teacher image, wherein
a pre-stage part of the coupled mathematical model generates a plurality of low-level feature maps from input image data,
compares the low-level feature maps of data sets belonging to the same type of learning target for the original domain and the target domain in the image data, calculates domain-shared features, and
calculates domain relaxation learning information for each feature space of (1) color, (2) illumination, (3) low frequency component, and (4) high frequency component among the domain-shared features, and further comprising:
a high dimension feature imparter to weight a feature map of the target domain input using the domain relaxation learning information to generate a new weighting feature map; and
a learning information corrector to switch the domain-shared features emphasized according to Epoch of main learning of an inference device.

* * * * *